United States Patent
Yi et al.

(10) Patent No.: US 12,159,120 B2
(45) Date of Patent: Dec. 3, 2024

(54) TRANSLATION METHOD AND APPARATUS AND ELECTRONIC DEVICE

(71) Applicant: Baidu Online Network Technology (Beijing) Co., Ltd., Beijing (CN)

(72) Inventors: Shaoting Yi, Beijing (CN); Yongjia Yu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 118 days.

(21) Appl. No.: 17/207,559

(22) Filed: Mar. 19, 2021

(65) Prior Publication Data

US 2021/0209428 A1    Jul. 8, 2021

(30) Foreign Application Priority Data

Sep. 7, 2020 (CN) .......................... 202010929840.1

(51) Int. Cl.
*G06F 40/58* (2020.01)
*G06F 40/40* (2020.01)
(Continued)

(52) U.S. Cl.
CPC .............. *G06F 40/58* (2020.01); *G06F 40/40* (2020.01); *G06V 30/153* (2022.01); *G06V 30/158* (2022.01); *G06V 30/18171* (2022.01); *G06V 30/268* (2022.01); *G06V 30/413* (2022.01); *G06V 30/10* (2022.01)

(58) Field of Classification Search
CPC .... G06V 30/268; G06V 10/424; G06F 40/40; G06F 40/58; G06K 9/00456; G06K 9/00442; G06K 9/344; G06K 9/4685; G06K 2209/01; G06K 9/723; G10L 15/00; G10L 15/22
See application file for complete search history.

(56) References Cited

U.S. PATENT DOCUMENTS 5,224,040 A    6/1993 Tou
6,321,189 B1*  11/2001 Masuichi ............ G06F 16/3335
                                                707/999.005
(Continued)

FOREIGN PATENT DOCUMENTS

CN    102982329 A    3/2013
CN    105786803 A    7/2016
(Continued)

OTHER PUBLICATIONS

Translation of Patent Publication CN102426607A as cited in OA, Apr. 25, 2012.*

(Continued)

*Primary Examiner* — Paras D Shah
(74) *Attorney, Agent, or Firm* — Maginot, Moore & Beck LLP (57) ABSTRACT

A translation method includes acquiring an image, where the image includes a text to be translated; splitting the text to be translated in the image and acquiring a plurality of target objects, where each of the plurality of target objects includes a word or a phrase of the text to be translated; receiving an input operation for the plurality of target objects, acquiring an object to be translated among the plurality of target objects, and translating the object to be translated.

10 Claims, 3 Drawing Sheets

(51) Int. Cl.
  *G06V 30/148* (2022.01)
  *G06V 30/18* (2022.01)
  *G06V 30/262* (2022.01)
  *G06V 30/413* (2022.01)
  *G06V 30/10* (2022.01)

(56) References Cited

U.S. PATENT DOCUMENTS

| | | | |
|---|---|---|---|
| 10,068,359 B2* | 9/2018 | Ohtsuka | G06F 40/58 |
| 2004/0210444 A1* | 10/2004 | Arenburg | G06F 40/263 |
| | | | 704/277 |
| 2010/0223047 A1 | 9/2010 | Christ | |
| 2014/0180670 A1* | 6/2014 | Osipova | G06V 20/20 |
| | | | 704/3 |
| 2015/0199908 A1 | 7/2015 | Smith et al. | |
| 2016/0117854 A1 | 4/2016 | Ohtsuka et al. | |
| 2018/0365234 A1* | 12/2018 | Imade | G06F 40/58 |
| 2019/0019511 A1* | 1/2019 | Kawano | G10L 15/10 |
| 2019/0164002 A1 | 5/2019 | Choi et al. | |
| 2019/0273767 A1* | 9/2019 | Nelson | H04M 7/0027 |
| 2020/0026766 A1* | 1/2020 | Ji | G06V 30/153 |
| 2020/0125644 A1* | 4/2020 | Liu | G06F 40/58 |
| 2021/0201266 A1* | 7/2021 | Wang | G06V 30/32 |

FOREIGN PATENT DOCUMENTS

| | | |
|---|---|---|
| CN | 106599888 A | 4/2017 |
| CN | 106855854 A | 6/2017 |
| CN | 107451127 A | 12/2017 |
| CN | 107656922 A | 2/2018 |
| CN | 109614628 A | 4/2019 |
| CN | 109657619 A | 4/2019 |
| CN | 110347978 A | 10/2019 |
| CN | 107037589 B | 12/2019 |
| CN | 111079489 A | 4/2020 |
| CN | 111144079 A | 5/2020 |
| EP | 3493110 A1 | 6/2019 |
| JP | 2000259630 A | 9/2000 |
| JP | 2012113459 A | 6/2012 |
| JP | 2015069365 A | 4/2015 |
| KR | 1020190063277 A | 6/2019 |

OTHER PUBLICATIONS

Extended European Search Report corresponding to European Patent Application No. 21163486.0, dated Sep. 10, 2021 (6 pages).
Japanese Office Action corresponding to Japanese Patent Application No. 2021-042333, dated Apr. 15, 2022 (5 pages).
English Translation of Japanese Office Action corresponding to Japanese Patent Application No. 2021-042333, dated Apr. 15, 2022 (5 pages).
Korean Office Action corresponding to Korean Patent Application No. 10-2021-0034701, dated Sep. 27, 2022 (6 bages).
English Translation of Korean Office Action corresponding to Korean Patent Application No. 10-2021-0034701, dated Sep. 27, 2022 (7 pages).
Chinese Office Action corresponding to Chinese Patent Application No. 202010929840.1, dated Jul. 31, 2023 (9 pages).
English Translation of Chinese Office Action corresponding to Chinese Patent Application No. 202010929840.1, dated Jul. 31, 2023 (6 pages).
Zhang Longkun et al. "Research on the application of screenshot recognition and translation based on machine learning" in Network Security Technology and Application (Aug. 2020) (4 Pages).
Machine English Translation of JP2000259630A. (25 Pages).
Machine English Translation of CN111079489A. (31 Pages).
Machine English Translation of CN110347978A. (14 Pages).
Machine English Translation of CN109657619A. (29 Pages).
Machine English Translation of JP2012113459A. (18 Pages).
Machine English Translation of CN109614628A. (20 Pages).
Machine English Translation of CN107656922A. (26 Pages).
Machine English Translation of CN107451127A. (35 Pages).
Machine English Translation of CN106599888A. (14 Pages).
Machine English Translation of CN105786803A. (16 Pages).
Machine English Translation of CN102982329A. (12 Pages).

* cited by examiner

TRANSLATION METHOD AND APPARATUS AND ELECTRONIC DEVICE

CROSS REFERENCE OF RELATED APPLICATION

The present disclosure claims priority of Chinese patent application No. 202010929840.1 filed on Sep. 7, 2020, which is incorporated herein by reference in its entirety.

TECHNICAL FIELD

The present disclosure relates to the field of computer vision technologies, in particular to a translation method, a translation apparatus and an electronic device.

BACKGROUND

A current translation may include a text translation, a voice translation or an image translation. In the text translation, a text content that needs to be translated is required to be inputted by the user manually. When the text content is a lot, an input cost is high. In the voice translation, the text content that needs to be translated is required to be inputted through the user reading the text content that needs to be translated. When a foreign content is not familiar to the user, the foreign content may not be inputted via voice. In the image translation, the text content that needs to be translated is required to be inputted by camera shooting, and a content acquired by camera shooting is translated based on an image understanding technology.

SUMMARY

A translation method, a translation apparatus, an electronic device and a storage medium are provided in the present disclosure.

In a first aspect, a translation method is provided, including: acquiring an image, where the image includes text to be translated; splitting the text to be translated in the image and acquiring a plurality of target objects, where each of the plurality of target objects includes a word or a phrase of the text to be translated; receiving an input operation for the plurality of target objects, acquiring an object to be translated among the plurality of target objects, and translating the object to be translated.

In a second aspect, a translation apparatus is provided, including: an acquisition module, configured to acquire an image, where the image includes text to be translated; a splitting module, configured to split the text to be translated in the image and acquire a plurality of target objects, where each of the plurality of target objects includes a word or a phrase of the text to be translated; a reception module, configured to receive an input operation for the plurality of target objects, and acquire an object to be translated among the plurality of target objects, and a translation module, configured to translate the object to be translated.

In a third aspect, an electronic device is provided, including: at least one processor; and a memory in communication connection with the at least one processor; where, the memory has stored thereon instructions executable by the at least one processor, and the instructions, when executed by the at least one processor, cause the at least one processor to perform any one of the methods in the first aspect.

In a fourth aspect, a non-transitory computer-readable storage medium having stored thereon computer instructions are provided, the computer instructions are used for causing a computer to perform any one of the methods in the first aspect.

According to technical solutions of the present disclosure, a problem of low efficiency in manually inputting a content to be translated by the user is solved. An image is acquired, where the image includes text to be translated, the text to be translated in the image is split and a plurality of target objects is acquired, where each of the plurality of target objects includes a word or a phrase of the text to be translated, an input operation for the plurality of target objects is received, an object to be translated among the plurality of target objects is acquired, and the object to be translated is translated. Thus the text to be translated is translated. Because only the image including the text to be translated is required in the above method, and the text to be translated does not required to be inputted by a user manually, thereby simplifying operations of the user and improving translation efficiency.

It should be appreciated that the content described in this section is not intended to identify key or important features of the embodiments of the present disclosure, nor is it intended to limit the scope of the present disclosure. Other features of the present disclosure are easily understood based on the following description.

BRIEF DESCRIPTION OF THE DRAWINGS

Drawings are included to provide a better understanding of the present disclosure and are not to be construed as limiting the present disclosure, in which.

DETAILED DESCRIPTION

Exemplary embodiments of the present disclosure are described below in conjunction with the drawings, including various details of embodiments of the present disclosure to facilitate understanding, which are to be considered merely exemplary. Accordingly, one of ordinary skill in the art should appreciate that various changes and modifications may be made to the embodiments described herein without departing from the scope and spirit of the present disclosure. Also, descriptions of well-known functions and structures are omitted from the following description for clarity and conciseness.

Figure 1:
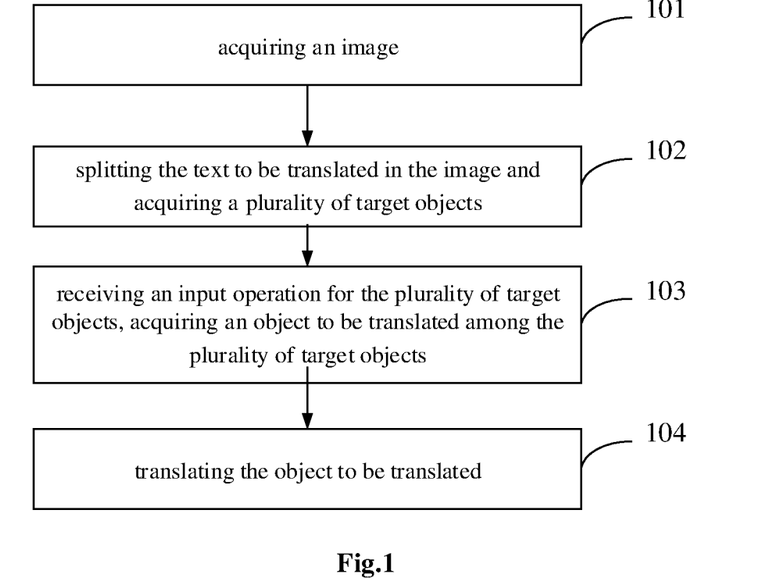
FIG. 1 is a flowchart of a translation method according to an embodiment of the present disclosure.

Referring to FIG. 1, FIG. 1 is a flowchart of a translation method according to an embodiment of the present disclosure. As shown in FIG. 1, the translation method is provided in the embodiment, applied to an electronic device, and includes the following steps.

Step 101 includes acquiring an image, where the image includes a text to be translated. The image includes the text to be translated, and may be acquired by camera shooting or scanning, which is not defined herein.

Step 102 includes splitting the text to be translated in the image and acquiring a plurality of target objects, where each of the plurality of target objects includes a word or a phrase of the text to be translated.

The text to be translated may be identified by using an image identification technology, and word segmentation may be performed on the identified text to acquire individual words and/or individual phrases, i.e., the plurality of target objects. Each target object includes a word or a phrase of the text to be translated.

Step 103 includes receiving an input operation for the plurality of target objects, acquiring an object to be translated among the plurality of target objects. The input operation for the plurality of target objects may be performed. For example, a part or all of the plurality of target objects may be selected to determine the object to be translated. That is, the object to be translated is a part or all of the plurality of target objects determined based on the input operation.

Step 104 includes translating the object to be translated. After the object to be translated has been acquired, the object to be translated may be translated by using a translation software. For example, the translation may be performed by using an Internet-based neural network translation system, and a translation result may be displayed on a display screen of the electronic device.

The electronic device may be a mobile phone, a tablet personal computer, a laptop computer, a personal digital assistant, a mobile internet device, or a wearable device, etc.

In the embodiment, an image is acquired, where the image includes a text to be translated, the text to be translated in the image is split and a plurality of target objects is acquired, where each of the plurality of target objects includes a word or a phrase of the text to be translated, an input operation for the plurality of target objects is received, an object to be translated among the plurality of target objects is acquired, and the object to be translated is translated. Thus the text to be translated is translated. Because the image including the text to be translated is only required in the above method, and the text to be translated does not required to be inputted by the user manually, thereby simplifying operations of the user and improving translation efficiency. In addition, the above method may also be applied to a case where the user does not know the text to be translated, which is helpful for the user to learn a new knowledge independently and learn a new thing.

In an embodiment of the present disclosure, the input operation is a first input for one target object or a plurality of target objects of which positions are discontinuous among the plurality of target objects, or a second input for a plurality of target objects of which positions are continuous among the plurality of target objects.

The first input may be a clicking and selecting input. For example, the clicking and selecting input may be performed on the plurality of target objects in the text, so as to select one target object or the plurality of target objects of which positions are discontinuous among the plurality of target objects. A position of a target object is a position where the target object is located in the text. A case where positions are discontinuous means that positions where a plurality of selected target objects are located in the text are not adjacent to each other. For example, when the plurality of selected target objects are in a same row, there are two non-adjacent target objects. Or, when the plurality of selected target objects are in different rows, there are two target objects that are not in adjacent rows respectively. In other words, one target object or the plurality of target objects of which the positions are discontinuous may be selected through the first input, and there is an unselected target object among the plurality of selected target objects in the text. For example, when ABCDE in the text represents 5 words and/or phrases in a sentence respectively, and each word or phrase is a target object, one or more target objects in ABCDE may be selected through the first input. The positions of the plurality of selected target objects are discontinuous. For example, ACD, BDE, or ABDE may be selected.

When performing the first input, the first input may include multiple clicking and selecting inputs. After one clicking and selecting input is finished, when a next clicking and selecting input is not detected within preset time, the first input may be considered to be finished by the user. At this time, the selected target object may be translated. The preset time may be 0.5 second or 1 second, etc. The preset time may be set according to practical applications, and is not defined herein.

In addition, the plurality of target objects of which the positions are continuous among the plurality of target objects may further be selected through the clicking and selecting input. For example, the plurality of target objects of which the positions are continuous may be selected through the clicking and selecting input or a sliding input.

For example, by long-pressing the target object at a starting position and sliding with a position of the target object as the starting position, target objects at positions included by a sliding trajectory are selected. Or, a rectangular region formed by the starting position and an end position of the sliding trajectory is determined, for example, the starting position is A1(x1, y1), the end position is B1(x2, y2), and four vertices of the rectangular region are (x1, y1), (x2, y1), (X1,y2) and (x2,y2) respectively, and target objects located in the rectangular region are selected. The plurality of target objects of which the positions are continuous may be selected quickly through the sliding input, thereby simplifying the selection operation of the user and improving the selection efficiency.

In the embodiment, the input operation is the first input for one target object or the plurality of target objects of which the positions are discontinuous among the plurality of target objects, or the second input for the plurality of target objects of which the positions are continuous among the plurality of target objects. When the input operation is the first input, the object to be translated includes one target object or the plurality of target objects of which the positions are discontinuous among the plurality of target objects. When the input operation is the second input, the object to be translated includes the plurality of target objects of which the positions are continuous among the plurality of target objects. A part or all of the plurality of target objects in the text may be selected by the user according to actual needs, thereby simplifying the selection operation of the user and improving the input efficiency. Since the plurality of target objects of which the positions are discontinuous or the plurality of target objects of which the positions are continuous in the text may be selected through the input operation, the plurality of target objects of which the positions are discontinuous or the plurality of target objects of which the positions are continuous in the text may be translated in the subsequent translation step, thereby improving the flexibility of translating a content in the text in a selection manner.

In an embodiment of the present disclosure, the splitting the text to be translated in the image and acquiring the plurality of target objects includes: performing content identification on the image and acquiring a first identification result; splitting words in the first identification result and acquiring the plurality of target objects; and displaying a click box at a position where each of the plurality of target objects is located in the image, where each of the plurality of target objects further includes the click box; where the receiving the input operation for the plurality of target objects and acquiring the object to be translated among the plurality of target objects includes: receiving an input operation for click boxes of the plurality of target objects and acquiring the object to be translated among the plurality of target objects. The object to be translated is a word or a phrase corresponding to the click box.

In the embodiment, after the image including the text to be translated has been acquired, a content of the image may be identified, and the first identification result is acquired. The first identification result may be referred to as an identified word region. Specifically, text information in the image is strengthened through image preprocessing to solve problems of distortion, blur, low light, and complex background of an original image.

Then the words may be split as follows. Specifically, the splitting the words in the first identification result and acquiring the plurality of target objects includes: splitting the words in the first identification result by row and acquiring at least one row of words information; and splitting each row of words information among the at least one row of words information according to a word-spacing, and acquiring the plurality of target objects.

Positions of the word regions in the image may be located by using a word detection technology. Horizontal cutting may be performed, that is, the word region is cut into rows of word regions, i.e., at least one row of words information.

Each row of words information among the at least one row of words information may be split separately. When splitting, the splitting may be performed according to the word-spacing. For example, two words separated by the word-spacing are two individual words. Or when splitting, a word identification function may be used to determine whether multiple consecutive words separated by the word-spacing form a phrase. When the phrase is formed, the splitting may be not performed on the multiple consecutive words, and the multiple consecutive words are taken as a whole. Each row of words information is split in the above-mentioned manner, so that multiple words and/or phrases are acquired. Each word or phrase is one target object. A granularity of splitting is reduced to be the word or the phrase, thereby facilitating selection of the word or phrase by the user, and meeting diverse translation requirements of the user.

According to the position of the target object in the image, the click box is displayed at the position of the target object. Each target object includes one click box. The click box may be selected by the user. When the click box is selected by the user, a word or phrase corresponding to the click box is selected.

When splitting, characteristics of the words may be used to perform splitting. For example, there may be a blank space between two words or phrases in the text. In English, each word is separated by a blank space. Each row of words may be split vertically, and a position of each word may be acquired. The position may be a smallest bounding rectangle of a region where the word is located. Then the click box may be displayed at the position of each word.

The click box is displayed at the position where each target object of the text is located in the image, and may be selected by the user. For example, one click box, click boxes of which position are continuous, or click boxes of which position are discontinuous may be selected through a clicking and selecting operation. The word or phrase corresponding to the selected click box is the object to be translated. When the click boxes of which the position are continuous are selected, based on a position relationship among the click boxes of which the position are continuous in the text, a position relationship among corresponding words or phrases in the object to be translated may be determined. For example, there are a click box 1, a click box 2 and a click box 3 arranged sequentially and continuously in the text, and corresponding words are "I", "like", and "it" respectively. In the object to be translated, a position relationship among "I", "like", and "it" may be determined based on a position relationship among the click boxes. That is, an order of the words in the object to be translated is "I", "like", and "it".

After the object to be translated has been acquired, the object to be translated may be translated by using an existing translation system, which is not defined herein.

In the embodiment, the content identification on the image is performed, the first identification result is acquired, the words in the first identification result are split and the plurality of target objects are acquired, and the click box at the position where each of the plurality of target objects is located in the image is displayed, where each of the plurality of target objects includes the click box; the input operation for the click boxes of the plurality of target objects is received and the object to be translated among the plurality of target objects is acquired. The object to be translated is the word or the phrase corresponding to the click box. The click box is provided for the user to select the target object. The user may select the target object by selecting the click box. Then the electronic device may perform translation on the target object selected by the user, thereby simplifying the input of the user, improving the input efficiency and improving the translation efficiency.

In an embodiment of the present disclosure, the displaying the click box at the position where each of the plurality of target objects is located in the image includes: displaying a mask layer with preset transparency at the position where each of the plurality of target objects is located in the image; and displaying the click box on the mask layer.

Further, in order to improve the display effect, after the position where the target object is located has been determined, the mask layer with preset transparency may be displayed at the position where the target object is located in the image. The mask layer with preset transparency may be referred to as a mask layer with a certain transparency effect covering the target object. The mask layer with preset transparency allows the user to still distinguish the target object under the mask layer through the mask layer. The preset transparency may be set practical applications, and is not defined herein. One mask layer is displayed on one target object, and the click box of the target object is displayed on the mask layer. An area of a region included by the click box may be slightly smaller than a coverage area of the corresponding mask layer. When the click box is selected by the user, a color, such as purple or blue, may be displayed in the region included by the click box, so as to prompt the user that the click box of the target object has been selected.

In the embodiment, in order to provide with a better display effect, the mask layer with preset transparency is displayed at the position where the target object is located in the image, and the click box is displayed on the mask layer, so that the target object that needs to be translated may be selected by selecting the click box, and the word or phrase that needs to be translated is not required to be inputted manually by the user, thereby simplifying the input operation of the user, improving the input efficiency and improving the translation efficiency.

In an embodiment of the present disclosure, the translating the object to be translated includes: translating the object to be translated and acquiring a translation result; acquiring a context of the object to be translated in the text to be translated, and extracting a plurality of knowledge points from a database; determining priorities of the plurality of knowledge points based on historical query data of a user; ranking the plurality of knowledge points according to the priorities, and acquiring top N knowledge points, where N is a positive integer; and displaying the translation result and the N knowledge points.

In the embodiment, not only the object to be translated is translated to acquire the translation result, but also multiple knowledge points are extracted from an existing database in combination with the context of the object to be translated in the text. The knowledge points may be information related to the target object, such as related allusions, fixed collocations of a group of words related to the target object, synonyms or antonyms of the target object, commonly used phrases about the target object, the target objects in tenses, etc., so as to provide the user with additional knowledge points for learning or understanding.

After the knowledge points have been acquired, priorities of the plurality of knowledge points may be determined based on historical query data of the user. For example, when the number of historical queries for one knowledge point is large, the priority of the knowledge point is higher. Or, the knowledge point is often used in spoken language, and the priority of the knowledge point is higher.

The plurality of knowledge points are ranked according to the priorities, and the top N knowledge points are acquired, where N is a positive integer. For example, N knowledge points are displayed sequentially from a low priority to a high priority when display. In this way, knowledge points with high priority may be displayed in front positions, and there is a high probability that required information is acquired by the user as soon as possible, thereby reducing the cost of looking for the information.

In an embodiment of the present disclosure, the splitting the text to be translated in the image and acquiring the plurality of target objects includes: identifying the image by using an identification model and acquiring a second identification result; and when it is determined that the image is an image in a study scenario according to the second identification result, splitting the text to be translated in the image and acquiring the plurality of target objects.

In the embodiment, the image is first identified to determine whether the image is the image in the study scenario. When the image is the image in the study scenario, the text in the image is split to acquire the plurality of target objects.

Generally, there are various and complex translation scenarios, including: a product translation, a textbook topic translation, an electronic screen translation, an error page translation, etc. Demands of the user in different scenarios are quite different. In the study scenario, the user has strong demands for knowledge such as structural grammar. In other general scenarios, the user has low demands for words, phrases, and sentences, so there is no need to split the text. In the embodiment, the study translation scenario may be filtered first by using a word scenario classification model. That is, when performing scenario identification on the image, an identification model (i.e., the word scenario classification model) may be used for identification. A process of acquiring the identification model may include the following steps.

First, images used in the study scenario and a non-study scenario are acquired, and each image is labelled manually to form a training set. The study scenario includes: images of printed text topics or images of color textbooks having pictures and texts.

Second, a classifier is trained by using the above training set to learn characteristics of images of each type.

Finally, after the classifier has been trained, an input image may be classified by using the classifier. In order to verify the effect of the classifier, a prediction result of the classifier may be further compared with a real label of the input image, so as to adjust parameters of the classifier, optimize the parameters of the classifier and improve the prediction accuracy of the classifier. The identification model may be referred to as a trained classifier.

The image may be identified by using the classifier, so as to determine whether the image is the image in the study scenario.

In the embodiment, before splitting the text in the image, it is determined first whether the image is the image in the study scenario. When the image is in the study scenario, the text in the image is split, thereby making the splitting more in line with scenario requirements, and reducing a case where the splitting is useless.

The translation method is illustrated below by taking an English translation as an example.

Step 1 includes learning identifying a translation scenario.

Generally, there are various and complex translation scenarios, including: the product translation, the textbook topic translation, the electronic screen translation, the error page translation, etc. Demands of the user in different scenarios are quite different. In the study scenario (such as an English text/topic), the user has strong demands for knowledge such as structural English grammar. In other general scenarios, the user has low demands for a word, a phrase, and a sentence. Thus, the study translation scenario may be filtered first by using a word scenario classification model.

First, images used in the study scenario and the non-study scenario are acquired, and each image is labelled manually to form a training set. The study scenario includes: images of printed text topics or images of color textbooks having pictures and texts.

Second, a classifier is trained by using the above training set to learn characteristics of images of each type.

Finally, after the classifier has been trained, an input image may be classified by using the classifier. In order to verify the effect of the classifier, a prediction result of the classifier may be further compared with a real label of the input image, so as to adjust parameters of the classifier, optimize the parameters of the classifier and improve the prediction accuracy of the classifier. The identification model may be referred to as the trained classifier.

The image may be identified by using the classifier, so as to determine whether the image is the image in the study scenario.

Step 2 includes performing word segmentation and identification by using an optical character recognition (OCR).

In an English study scenario, an English word is a valid semantic segment with a smallest granularity. In order to meet the multi-granularity translation demands of the user, a text content in the image is identified and split based on an OCR word detection and splitting technology.

Figure 2A:
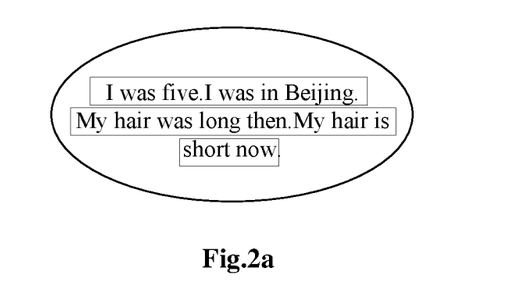
FIG. 2a-FIG. 2b are schematic diagrams of text splitting results according to an embodiment of the present disclosure.
Figure 2B:
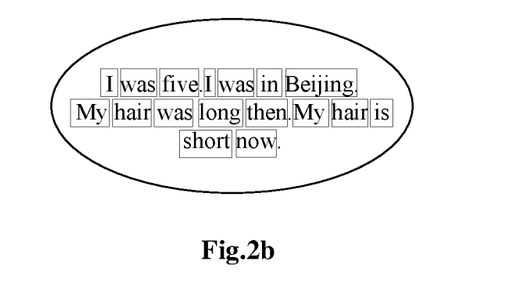
Figure 2C:
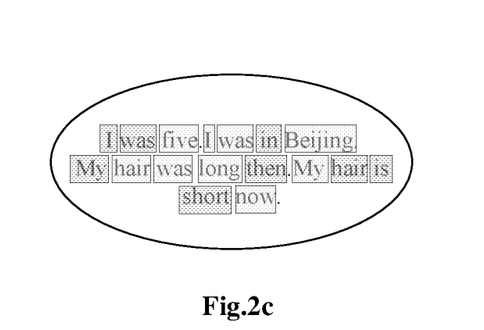
FIG. 2c is a schematic diagram of a selection interface of objects to be translated according to an embodiment of the present disclosure.

First, based on a deep learning technology, text information in the image is strengthened through image preprocessing to solve problems of distortion, blur, low light, and complex background of the original image. Second, the positions of the word regions in the image may be located by using a word detection technology. Horizontal cutting may be performed, that is, the word region is cut into rows of word regions. As shown in FIG. 2a, wireframes outside words are word regions acquired after cutting horizontally. After the word detection has been finished, based on the characteristics of English words being separated by the blank space, vertical cutting may be performed on the English words, as shown in FIG. 2b. Position coordinates of a region where a corresponding word is located is acquired. A wireframe outside a word in FIG. 2b is a word position region acquired after cutting vertically. The mask layer and the click box are displayed on the word acquired after the cutting has been performed, as shown in FIG. 2c. A transparency of the mask layer in FIG. 2c is 0.5, and a box outside the word in the figure is the click box. Through the click box, a selection operation may be performed by the user more conveniently, so as to select the text content to be translated.

Finally, word identification is performed to identify the specific text content in the image, and acquire text and layout information as well, so as to acquire the specific text content. Thus, a corresponding text content may be acquired when a corresponding click box is clicked by the user later.

Step 3 includes clicking content to be translated.

Compared with that only an interactive operation of clicking and translating a single word is supported in the related art, the word, phrase, sentence, paragraph or article that needs to be translated may be selected through a clicking and selecting manner of non-continuous and multi-selection in the present disclosure. A specific implementation is as follows. Since the word segmentation is performed according to the granularity of the word in the second step, one single click box corresponds to one word in an actual clicking and selecting process. When the clicking and selecting operation of the user is detected, words corresponding to multiple click boxes are separated by the blank spaces to form a new phrase, sentence or paragraph.

After the clicking and selecting operation has been finished, when a next clicking and selecting operation is not detected within 1s, the content to be translated may be considered to be selected by the user. At this time, a subsequent translation is automatically performed to acquire corresponding structured study information.

Figure 2D:
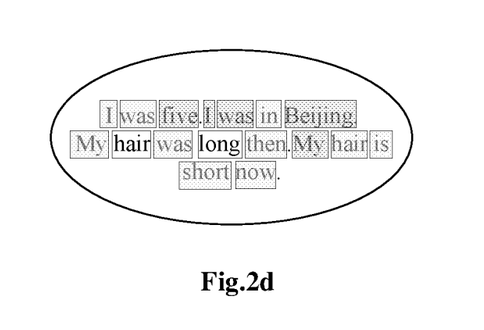
FIG. 2d-FIG. 2e are schematic diagrams of selection results of the objects to be translated according to an embodiment of the present disclosure.
Figure 2E:
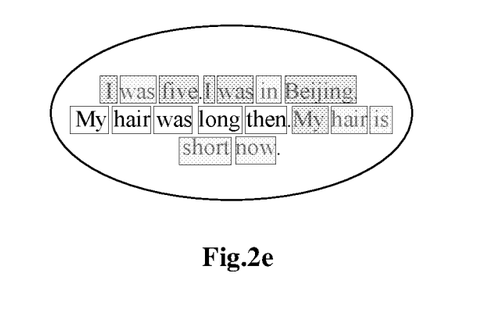

In the process of selecting the content, a selection manner may include a shortcut manner of long pressing a first word and quickly sliding to select the continuous text content, thereby reducing the operation cost of continuous clicking of the user in the case of translating a long text. As shown in FIG. 2d, selected words are not continuous in the text. A color of the selected words may be different from that of unselected words, or a transparency of mask layers at positions where the selected words are located may be different from a transparency of mask layers at positions where the unselected words are located, so as to prompt the user that those words are selected. In FIG. 2d, the mask layers at the positions where the selected words are located are fully transparent, such as mask layers at positions where "hair" and "long" are located. As shown in FIG. 2e, the selected words are continuous in the text. For example, selected "My", "hair", "was", "long", and "then" are words in a same sentence in the text.

Step 4 includes words translation.

After a word identification result has been acquired, a content in a foreign language may be translated into a content in Chinese by using the Internet-based neural network translation system, thereby helping the user to acquire a specific Chinese interpretation of the content in the foreign language and grasp the foreign language in a better manner.

Step 5 includes displaying structured English study information.

In response to demands in the study scenario, based on requirements of high school and college entrance examination syllabi, in addition to basic translation results, a key vocabulary, a phrase and a grammatical sentence pattern are further provided to the user based on key points of the examinations, and a frequency of the corresponding content that appears in previous high school and college entrance examinations is further provided, thereby helping students to understand the key points of the examinations more conveniently, and acquire structured English study information.

A process of displaying the structured study information mainly includes: 1, extracting a content of a knowledge point from an image taken by the user, 2, pulling corresponding study data from a database based on the extracted knowledge point, and, 3, grading the content of the knowledge point and display the content of the knowledge point on a front end.

Knowledge point extraction may be performed by analyzing and identifying whether there is a key point of the examinations about the word using intelligent semantic analysis technology.

Study data may be pulled by manually enriching the key points of the high school and college entrance examinations and corresponding information based on the study of the syllabi. For example: for a word, corresponding words in tenses, a commonly used phrase, a fixed collocation, a grammar and other information of the word may be enriched, so as to cover the key points of the examinations.

Information display. After the corresponding data is pulled, priorities of contents in a result page are dynamically adjusted based on a distribution of requirements of a group of users on the text historically. Taking a word of come as an example, fixed collocation phrase information of the word was mainly searched by the users in historical search operations. The fixed collocation phrase information of the word may be ranked higher when displaying the translation results, thereby reducing the cost of looking for the information.

The translation method in the present disclosure has the following beneficial effects. Input efficiency is high, one word may be identified in 1 second, a speed of searching the phrase, sentence, and paragraph is 5 times of that of inputting the text, thereby greatly improving study efficiency.

There is no barrier in inputting the text, the text may be inputted only by taking the image, and word segmentation may be performed automatically. The content may be automatically identified and translated after clicking and selecting, and it is able to completely solve a problem that the text content may not be inputted when the user does not know the text content by using visual understanding technology.

There is multi-dimensional translation granularity, so as to solve a problem that such granular content as the phrase, the sentence, and the paragraph may not be translated in a screen translation mode, or a selected word/word acquired after the segmentation has been performed translation mode of a current image translation mode, so as to meet demands for diversification translation in the study scenario conveniently, and meet demands for study in a better manner.

Further, differentiated and structured study information may be provided to the user based on the phrase, sentence or paragraph, so as to efficiently acquire a key content of the examinations and improve the study efficiency.

Figure 3:
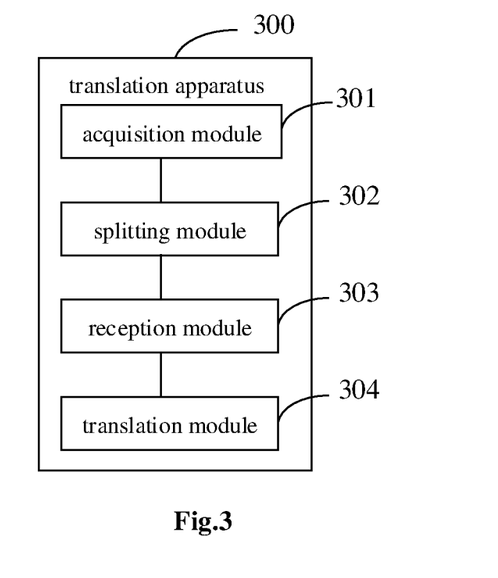
FIG. 3 is a schematic structural diagram of a translation apparatus according to an embodiment of the present disclosure.

Referring to FIG. 3, FIG. 3 is a structural diagram of an audio adjustment device according to an embodiment of the present application. As shown in FIG. 3, a translation apparatus 300 is provided in the embodiment, including: an acquisition module 301, configured to acquire an image, where the image includes a text to be translated; a splitting module 302, configured to split the text to be translated in the image and acquire a plurality of target objects, where each of the plurality of target objects includes a word or a phrase of the text to be translated; a reception module 303, configured to receive an input operation for the plurality of target objects, and acquire an object to be translated among the plurality of target objects, and a translation module 304, configured to translate the object to be translated.

In an embodiment of the present disclosure, the object to be translated includes one target object or a plurality of target objects of which positions are discontinuous among the plurality of target objects, or a plurality of target objects of which positions are continuous among the plurality of target objects.

In an embodiment of the present disclosure, the splitting module 302 includes: a first identification sub-module, configured to perform content identification on the image and acquiring a first identification result; a first splitting sub-module, configured to split words in the first identification result and acquire the plurality of target objects; and a first display sub-module, configured to display a click box at a position where each of the plurality of target objects is located in the image, where each of the plurality of target objects further includes the click box. The reception module 303 is further configured to receive an input operation for click boxes of the plurality of target objects and acquire the object to be translated among the plurality of target objects. The object to be translated is a word or a phrase corresponding to the click box In an embodiment of the present disclosure, the first display sub-module includes: a first display unit, configured to display a mask layer with preset transparency at the position where each of the plurality of target objects is located in the image; and a second display unit, configured to display the click box on the mask layer.

In an embodiment of the present disclosure, the translation module 304 includes: a translation sub-module, configured to translate the object to be translated and acquire a translation result; a first acquisition sub-module, configured to acquire a context of the object to be translated in the text to be translated, and extract a plurality of knowledge points from a database; a determination sub-module, configured to determine priorities of the plurality of knowledge points based on historical query data of a user; a ranking sub-module, configured to rank the plurality of knowledge points according to the priorities, and acquire top N knowledge points, where N is a positive integer; and a second display sub-module, configured to display the translation result and the N knowledge points.

In an embodiment of the present disclosure, the splitting module 302 includes: a second identification sub-module, configured to identify the image by using an identification model and acquire a second identification result; and a second splitting sub-module, configured to, when it is determined that the image is an image in a study scenario according to the second identification result, split the text to be translated in the image and acquire the plurality of target objects.

The translation apparatus 300 is capable of implementing various processes in the embodiment of the translation method. To avoid repetition, details are not described herein again.

In the translation apparatus 300 of the embodiment of the present disclosure, an image is acquired, where the image includes a text to be translated, the text to be translated in the image is split and a plurality of target objects is acquired, where each of the plurality of target objects includes a word or a phrase of the text to be translated, an input operation for the plurality of target objects is received, an object to be translated among the plurality of target objects is acquired, and the object to be translated is translated. Thus the text to be translated is translated. Because only the image including the text to be translated is required in the above method, and the text to be translated does not required to be inputted by the user manually, thereby simplifying operations of the user and improving translation efficiency.

According to embodiments of the present disclosure, an electronic device and a readable storage medium are further provided.

Figure 4:
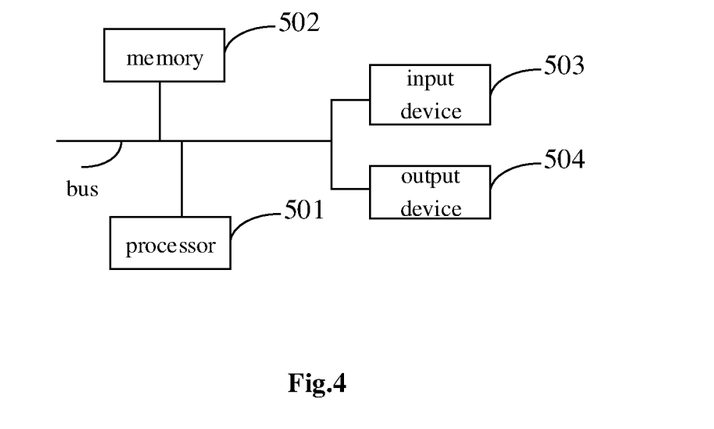
FIG. 4 is a block diagram of an electronic device for implementing the translation method in the embodiment of the present disclosure.

As shown in FIG. 4, a block diagram of an electronic device for implementing the translation method in the embodiment of the present disclosure is shown. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistant, cellular telephones, smart phones, wearable devices, and other similar computing devices. The components shown herein, their connections and relationships, and their functions are by way of example only and are not intended to limit the implementations of the present disclosure described and/or claimed herein.

As shown in FIG. 4, the electronic device includes: one or more processors 501, a memory 502, and interfaces for connecting various components, including a high-speed interface and a low-speed interface. The various components are interconnected using different buses and may be mounted on a common motherboard or otherwise mounted as desired. The processors may process instructions for execution within the electronic device, including instructions stored in the memory or on the memory to display graphical information of GUI on an external input/output device, such as a display device coupled to the interface. In other embodiments, multiple processors and/or multiple buses may be used with multiple memories, if necessary. Also, multiple electronic devices may be connected, each providing some of the necessary operations (e.g., as an array of servers, a set of blade servers, or a multiprocessor system). In FIG. 4, an example of one processor 501 is illustrated.

The memory 502 is a non-transitory computer-readable storage medium provided herein. The memory has stored thereon instructions executable by the at least one processor to cause the at least one processor to perform the translation method in the present disclosure. The non-transitory computer-readable storage medium of the present disclosure has stored thereon computer instructions for causing a computer to perform the translation method in the present disclosure.

The memory 502, as a non-transitory computer-readable storage medium, may be used to store non-transitory software programs, non-transitory computer-executable programs, and modules, such as program instructions/modules (e.g., the acquisition module 301, the splitting module 302, the reception module 303 and the translation module 304 shown in FIG. 3) corresponding to the translation method in the embodiments of the present the present. By running non-transitory software programs, instructions and modules stored in the memory 502, the processor 501 executes various functional applications and data processing of the server, i.e. implements the translation method in the method embodiment described above.

The memory 502 may include a program storage area and a data storage area, where the program storage area may store an operating system, and application programs for at least one function; and the data storage area may store data created according to the use of the electronic device for implementing the translation method. In addition, the memory 502 may include a high speed random access memory, and may also include a non-transitory memory, such as at least one disk storage device, flash memory device, or other non-transitory solid state memory device. In some embodiments, the memory 502 may alternatively include a memory remotely located with respect to the processor 501, which may be connected via a network to the electronic device for implementing the translation method. Examples of the network mentioned above include, but are not limited to, the Internet, intranets, local area networks, mobile communication networks, and combinations thereof.

The electronic device for implementing the translation method may further include: an input device 503 and an output device 504. The processor 501, the memory 502, the input device 503, and the output device 504 may be connected to each other via a bus or in other ways. In FIG. 4, a bus for connection is taken as an example.

The input device 503 may receive input numeric or character information and generate key signal inputs related to user settings and functional controls of the electronic device for implementing the translation method. For example, the input device may include a touch screen, a keypad, a mouse, a trackpad, a touch pad, a pointing stick, one or more mouse buttons, a trackball, a joystick, etc. The output device 504 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, application-specific integrated circuits (ASICs), computer hardware, firmware, software, and/or combinations thereof. These various embodiments may include implementation in one or more computer programs that may be executed and/or interpreted on a programmable system including at least one programmable processor, which may be a dedicated or general purpose programmable processor, that may receive data and instructions from a storage system, at least one input device and at least one output device, and transmit the data and the instructions to the storage system, the at least one input device and the at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide interaction with a user, the systems and techniques described herein may be implemented on a computer having: a display device (e.g., a cathode ray tube (CRT) or liquid crystal display (LCD) monitor) for displaying information to a user; and a keyboard and a pointing device (e.g., a mouse or a trackball) through which a user may provide input to the computer. Other types of devices may also be used to provide interaction with a user; for example, the feedback provided to the user may be any form of sensory feedback (e.g., visual feedback, auditory feedback, or tactile feedback); and input from the user may be received in any form, including acoustic input, voice input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or a computing system that includes any combination of such background components, middleware components, or front-end components. The components of the system may be interconnected by any form or medium of digital data communication (e.g., a communication network). Examples of communication networks include: a local area network (LAN), a wide area network (WAN) and the Internet.

The computer system may include a client and a server. The client and server are typically far away from each other and typically interact through a communication network. The relationship of the client and the server is generated by computer programs running on respective computers and having a client-server relationship with each other.

According to technical solutions of the present disclosure, an image is acquired, where the image includes a text to be translated, the text to be translated in the image is split and a plurality of target objects is acquired, where each of the plurality of target objects includes a word or a phrase of the text to be translated, an input operation for the plurality of target objects is received, an object to be translated among the plurality of target objects is acquired, and the object to be translated is translated. Thus the text to be translated is translated. Because the image including the text to be translated is only required in the above method, and the text to be translated does not required to be inputted by the user manually, thereby simplifying operations of the user and improving translation efficiency. In addition, the above method may also be applied to a case where the user does not know the text to be translated, which is helpful for the user to learn a new knowledge independently and learn a new thing.

The input operation is the first input for one target object or the plurality of target objects of which the positions are discontinuous among the plurality of target objects, or the second input for the plurality of target objects of which the positions are continuous among the plurality of target objects. A part or all of the plurality of target objects in the text may be selected by the user according to actual needs, thereby simplifying the selection operation of the user and improving the input efficiency. Since the plurality of target objects of which the positions are discontinuous or the plurality of target objects of which the positions are continuous in the text may be selected through the input operation, the plurality of target objects of which the positions are discontinuous or the plurality of target objects of which the positions are continuous in the text may be translated in the subsequent translation step, thereby improving the flexibility of translating a content in the text in a selection manner.

The content identification on the image is performed, the first identification result is acquired, the words in the first identification result are split and the plurality of target objects are acquired, and the click box at the position where each of the plurality of target objects is located in the image is displayed, where each of the plurality of target objects includes the click box; the input operation for the click boxes of the plurality of target objects is received and the object to be translated among the plurality of target objects is acquired. The object to be translated is the word or the phrase corresponding to the click box. The click box is provided for the user to select the target object. The user may select the target object by selecting the click box. Then the electronic device may perform translation on the target object selected by the user, thereby simplifying the input of the user, improving the input efficiency and improving the translation efficiency.

In order to provide with a better display effect, the mask layer with preset transparency is displayed at the position where the target object is located in the image, and the click box is displayed on the mask layer, so that the target object that needs to be translated may be selected by selecting the click box, and the word or phrase that needs to be translated is not required to be inputted manually by the user, thereby simplifying the input operation of the user, improving the input efficiency and improving the translation efficiency.

The plurality of knowledge points are ranked according to the priorities, and the top N knowledge points are acquired, where N is a positive integer. For example, N knowledge points are displayed sequentially from a low priority to a high priority when display. In this way, knowledge points with high priority may be displayed in front positions, and there is a high probability that required information is acquired by the user as soon as possible, thereby reducing the cost of looking for the information.

Before splitting the text in the image, it is determined first whether the image is the image in the study scenario. When the image is in the study scenario, the text in the image is split, thereby making the splitting more in line with scenario requirements, and reducing a case where the splitting is useless.

It should be appreciated that the various forms of processes shown above may be used to reorder, add, or delete steps. For example, the steps recorded in the present disclosure may be performed in parallel, sequentially, or in a different order, as long as a desired result of the technical solutions disclosed in the present disclosure can be achieved, which is not defined herein.

The foregoing specific implementations do not constitute a limitation on the protection scope of the present disclosure. Those skilled in the art should understand that various modifications, combinations, sub-combinations, and substitutions may be made according to design requirements and other factors. Any modifications, equivalent substitutions, improvements, or the like made within the spirit and principles of the present disclosure shall be included in the protection scope of the present disclosure.

What is claimed is:

1. A translation method, performed by an electronic device, the method comprising:
  acquiring an image, wherein the acquired image comprises a text to be translated;
  splitting the text to be translated in the acquired image and acquiring a plurality of target objects, wherein each of the plurality of target objects comprises a word or a phrase of the text to be translated; and
  receiving an input operation for the plurality of target objects, and acquiring an object to be translated among the plurality of target objects; and
  translating the object to be translated;
  wherein the translating the object to be translated comprises:
    translating the object to be translated and acquiring a translation result;
    acquiring a context of the object to be translated in the text to be translated, and extracting a plurality of knowledge points from a database, wherein the knowledge points comprise fixed collocations of a group of words related to the object to be translated, related allusions of the target objects, the target objects in tenses and grammatical sentence pattern of the target objects;
    determining priorities of the plurality of knowledge points based on historical query data of a user;
    ranking the plurality of knowledge points according to the priorities, and acquiring top N knowledge points, wherein N is a positive integer; and
    displaying the translation result and the N knowledge points;
  wherein the splitting the text to be translated in the acquired image and acquiring the plurality of target objects comprises:
    identifying the acquired image by using an identification model and acquiring a second identification result; and
    when it is determined that the acquired image is a study scenario image of a plurality of study scenario images used in a study scenario according to the second identification result, splitting the text to be translated in the acquired image and acquiring the plurality of target objects, wherein the study scenario images comprise (i) images of printed text topics, or (ii) images of color textbooks having pictures and texts;
  wherein the acquiring process of the identification model comprises:
    acquiring the study scenario images and non-study scenario images used in a non-study scenario, and labelling manually each of the study scenario images and each of the non-study scenario images to form a training set;
    training a classifier by using the training set to learn characteristics of the study scenario images and the non-study scenario images;
    predicting classifications of input images by using the trained classifier, comparing a prediction result of the trained classifier with a real label of an input image of the input images, to adjust parameters of the trained classifier, thereby forming an adjusted classifier; and identifying the input images by using the adjusted classifier, to determine whether the input images are the study scenario images used in the study scenario.

2. The method according to claim 1, wherein the object to be translated comprises one target object or a plurality of target objects of which positions are discontinuous among the plurality of target objects, or a plurality of target objects of which positions are continuous among the plurality of target objects.

3. The method according to claim 1, wherein the splitting the text to be translated in the acquired image and acquiring the plurality of target objects comprises:
performing a content identification on the acquired image and acquiring a first identification result;
splitting words in the first identification result and acquiring the plurality of target objects; and
displaying a click box at a position where each of the plurality of target objects is located in the acquired image, wherein each of the plurality of target objects further comprises the click box;
wherein the receiving the input operation for the plurality of target objects and acquiring the object to be translated among the plurality of target objects comprises:
receiving an input operation for click boxes of the plurality of target objects and acquiring the object to be translated among the plurality of target objects, wherein the object to be translated is a word or a phrase corresponding to the click box.

4. The method according to claim 3, wherein the splitting the words in the first identification result and acquiring the plurality of target objects comprises:
splitting the words in the first identification result by row and acquiring at least one row of words information; and
splitting each row of words information among the at least one row of words information according to a word-spacing, and acquiring the plurality of target objects.

5. The method according to claim 3, wherein the displaying the click box at the position where each of the plurality of target objects is located in the acquired image comprises:
displaying a mask layer with preset transparency at the position where each of the plurality of target objects is located in the acquired image; and displaying the click box on the mask layer.

6. A translation apparatus, comprising:
at least one processor; and
a memory in communication connection with the at least one processor;
wherein the memory has stored thereon instructions executable by the at least one processor, and the instructions are executed by the at least one processor to enable the at least one processor to:
acquire an image, wherein the acquired image comprises a text to be translated;
split the text to be translated in the acquired image and acquire a plurality of target objects, wherein each of the plurality of target objects comprises a word or a phrase of the text to be translated;
receive an input operation for the plurality of target objects, and acquire an object to be translated among the plurality of target objects, and translate the object to be translated;
wherein executing the instructions to translate the object to be translated includes executing the instructions by the at least one processor to enable the at least one processor to:

translate the object to be translated and acquire a translation result;
acquire a context of the object to be translated in the text to be translated, and extract a plurality of knowledge points from a database, wherein the knowledge points comprise fixed collocations of a group of words related to the object to be translated, related allusions of the target objects, the target objects in tenses and grammatical sentence pattern of the target objects;
determine priorities of the plurality of knowledge points based on historical query data of a user;
rank the plurality of knowledge points according to the priorities, and acquire top N knowledge points, wherein N is a positive integer; and
display the translation result and the N knowledge points;
wherein executing the instructions to split the text to be translated in the acquired image and to acquire the plurality of target objects includes executing the instructions by the at least one processor to enable the at least one processor to:
identify the acquired image by using an identification model and acquiring a second identification result; and
when it is determined that the acquired image is a study scenario image of a plurality of study scenario images used in a study scenario according to the second identification result, split the text to be translated in the acquired image and acquire the plurality of target objects, wherein the study scenario images comprise (i) images of printed text topics, or (ii) images of color textbooks having pictures and texts;
wherein the acquiring process of the identification model comprises:
acquiring the study scenario images and non-study scenario images used in a non-study scenario, and labelling manually each of the study scenario image and each of the non-study scenario images to form a training set;
training a classifier by using the training set to learn characteristics of the study scenario images and the non-study scenario images;
predicting classifications of input images by using the trained classifier, comparing a prediction result of the trained classifier with a real label of an input image of the input images, to adjust parameters of the trained classifier, thereby forming an adjusted classifier; and
identifying the input images by using the adjusted classifier, to determine whether the input images are the study scenario images used in the study scenario.

7. The apparatus according to claim 6, wherein the object to be translated comprises one target object or a plurality of target objects of which positions are discontinuous among the plurality of target objects, or a plurality of target objects of which positions are continuous among the plurality of target objects.

8. The apparatus according to claim 6, wherein the instructions is executed by the at least one processor to enable the at least one processor to:
perform a content identification on the acquired image and acquiring a first identification result;
split words in the first identification result and acquire the plurality of target objects; and
display a click box at a position where each of the plurality of target objects is located in the acquired image, wherein each of the plurality of target objects further comprises the click box;

wherein the instructions is executed by the at least one processor to enable the at least one processor to receive an input operation for click boxes of the plurality of target objects and acquire the object to be translated among the plurality of target objects, wherein the object to be translated is a word or a phrase corresponding to the click box.

9. The apparatus according to claim 8, wherein the instructions is executed by the at least one processor to enable the at least one processor to:

split the words in the first identification result by row and acquire at least one row of words information; and split each row of words information among the at least one row of words information according to a word-spacing, and acquire the plurality of target objects.

10. The apparatus according to claim 8, wherein the instructions is executed by the at least one processor to enable the at least one processor to:

display a mask layer with preset transparency at the position where each of the plurality of target objects is located in the acquired image; and display the click box on the mask layer.

* * * * *